United States Patent [19]
Kikuchi et al.

[11] Patent Number: 5,827,120
[45] Date of Patent: Oct. 27, 1998

[54] NETWORK GAME SYSTEM HAVING COMMUNICATION CHARACTERS FOR CONVERSATION CHANGING INTO ACTION CHARACTERS FOR ACTION GAMING

[75] Inventors: Misao Kikuchi; Yasushi Kitagawa; Shuji Oba; Tadayuki Tahara; Makoto Urano; Masura Watanabe; Makiko Furuno, all of Kawasaki; Hisayoshi Hayasaka, Sendai; Kiyotaka Yago, Sendai; Yoshinori Saito, Sendai, all of Japan

[73] Assignee: Fujitsu Limited, Kanagawa, Japan

[21] Appl. No.: 676,453

[22] Filed: Jul. 8, 1996

[30] Foreign Application Priority Data

Dec. 14, 1995 [JP] Japan ................................. 7-326117

[51] Int. Cl.⁶ ................................................ A63F 9/22
[52] U.S. Cl. ............................................... 463/40; 463/31
[58] Field of Search ................... 463/40, 41, 42, 463/8, 7, 1, 35, 31, 30; 364/410; 455/66; 345/173, 122

[56] References Cited

U.S. PATENT DOCUMENTS

| | | | |
|---|---|---|---|
| 4,521,014 | 6/1985 | Sitrick | 463/40 X |
| 5,393,071 | 2/1995 | Best | 463/35 |
| 5,580,308 | 12/1996 | Nakarmura | 463/7 |

*Primary Examiner*—Jessica Harrison
*Assistant Examiner*—Michael O'Neill
*Attorney, Agent, or Firm*—Helfgott & Karas, P.C.

[57] ABSTRACT

After an opponent is determined by a search made in a communication character service, there may be effected transition to an action game service under control of the host computer, or a fight may be performed between terminal apparatuses that directly communicate with each other with temporary disconnection to the host computer. By preparing morphing intermediate moving images, the transition from communication character service to the action game service can be effected without causing an incongruous feeling.

8 Claims, 28 Drawing Sheets

NETWORK GAME SYSTEM HAVING COMMUNICATION CHARACTERS FOR CONVERSATION CHANGING INTO ACTION CHARACTERS FOR ACTION GAMING

BACKGROUND OF THE INVENTION

1. Field of the Invention

The present invention relates to a technique that is effectively used for a network game in which a player performs communication or a game by manipulating a character displayed on the screen on a communication network such as a personal computer network.

2. Description of the Related Art

There is known a service that allows a user to manipulate a communication character on a network to thereby converse with another communication character or experience various things on a virtual world developed on the network.

FIG. 18 shows a picture of a communication service called "Habitat" which is provided by a personal computer communication providing company, NIFTY Corp. (joint company of Fujitsu Ltd. and Nissho Iwai Corp.) In this communication service, as shown in FIG. 18, a communication character that is a personification of a subscriber is moved on the screen by the subscriber's manipulation on his terminal, or is caused to converse with a communication character that is a personification of another subscriber who is accessing the communication network by displaying characters inputted through a keyboard.

FIG. 17 shows a system configuration for providing such a communication service. A subscriber A terminal apparatus 131 is equipped with an information processing terminal 1311 in which special software necessary to receive the communication service concerned is installed, a communication device 1312 such as a modem for connection to a public line network 1331, input devices 1314 consisting of a keyboard, a mouse, etc., and a display 1313 for displaying pictures as shown in FIG. 18. The public line network 1331 is connected to a host computer 135 via a VAN network 1332.

A similar device configuration is provided on a subscriber B terminal apparatus 132. When, for instance, subscriber A establishes connection to the host computer 135 by manipulating the input devices 1314 and a communication service is thereby started, a communication character 1371 which is a personification of subscriber A is allowed to walk in an area map 1374 designated by the host computer 135. Where another subscriber (for instance, subscriber B) exists in this area map, his communication character 1373 can also be displayed simultaneously in the same area map (same picture). This picture is displayed on the respective displays 1313 of subscribers A and B in the same manner, whereby the subscribers can cause the communication characters to walk, jump, and perform other actions, or enjoy a conversation 1372 by displaying characters that are inputted through the keyboard (input devices 1314).

FIG. 19 shows functional configurations of the subscriber A terminal apparatus 131 and the host computer 135 for implementing the above communication service.

In the subscriber A-side terminal apparatus 131, data display 1381 is implemented by the display 1313 and data input 1382 is implemented by the input devices 1314 constituted of a keyboard etc. A data transmission/reception function 1384, a center connection processing function 1385, an image processing function 1387, and generation of communication character image data 1388 and communication field image data 1389, and communication processing 1392 are implemented by software. These functions are controlled by a microprocessor (not shown; operating on software) in the information processing terminal 1311.

In the host computer 135, a data transmission/reception function 1352, communication character management 1352, a character display coordinates management function 1354, communication field management 1355, and other functions are managed by software on the host computer 135 side. These functions are controlled by an information processing function 1351 that is implemented by a microprocessor in the host computer 135.

FIG. 23 shows a state that subscriber A has selected a desired communication character 1363 from among a number of communication characters in his own terminal apparatus 131 before establishing connection to the host computer 135. Similarly, subscriber B has also selected a communication character 1364 in his own terminal apparatus 132.

FIG. 24 shows a state that the subscriber A terminal apparatus 131 and the subscriber B terminal apparatus 132 have established connection to the host computer 135. That is, after subscriber A has established connection from his own terminal apparatus 131 to the host computer 135 via a network 1365 (i.e., the public line network 1331 and the VAN network 1332), electronic image data are generated in the host computer 135, whereby subscriber A is rendered in such a state being able to move the communication character 1363 freely in an area 1367 that is divided into a plurality of areas. The host computer 135 transmits coordinates data in the area 1368 and communication character ID data that have been predetermined between the terminal apparatuses and the host computer 135 to all of the subscribers (in this case, A and B. and to the respective terminal apparatuses 131 and 132) existing in the same area 1368.

As a result, in the subscriber A terminal apparatus 131, his own communication character 1363 and the communication character 1364 of subscriber B are displayed based on the character ID data sent from the host computer 135 at coordinates that are determined based on the coordinates data sent from the host computer 135. They are also displayed in a similar manner in the subscriber B terminal apparatus 132.

FIG. 25 shows a sequence from an operation that the subscriber A terminal apparatus 131 and the subscriber B terminal apparatus 132 establish connection to the host computer 135 by accessing it via the network 1331 to an operation that they disconnect the lines.

Each of the terminal apparatuses 131 and 132 is equipped with a plurality of communication character data 1388 (see FIG. 19). In each terminal apparatus, the image processing function 1387 causes those communication character data 1388 to be displayed on the display 1313, and have the subscriber select an arbitrary communication character through the input devices 1314. (step (1))

Thereafter, the center connection processing function 1385 calls the host computer 135 (step (2)), and connection is established (step (3)). The host computer 135 transmits a map menu to the terminal apparatus 131 based on the communication field management function 1355 in the host computer 135 (step (4)). The map menu is used by subscriber A to select, from among a plurality of areas 1367, an area where his own communication character is to be located. Subscriber A informs, from his terminal apparatus 131, the host computer 135 that he has selected an area (map) 1368 (step (5)).

The host computer 135 transmits, to the terminal apparatus 131, the selected area 1368 and data of all the communication characters existing in the area by means of the communication character management function 1353, the coordinates management function 1354, and the data transmission/reception function 1352 (step (6)). While the subscriber A terminal apparatus 131 displays the area 1368 and the communication characters on the display 1313 based on the data sent from the host computer 135, it transmits play data such as conversation data to the host computer 135 by using the input devices 1314. In response, the host computer 135 collects play data from all the subscribers, and distributes those data to the respective subscribers (step (8)).

To finish the above communication service, the terminal apparatus 131 sends a line disconnection request (step (9)). In response, the host computer 135 performs line disconnection processing (step (10)).

In addition to the communication service as described above, there is known a technique that allows subscribers to enjoy an action game between them by connecting their terminal apparatuses 141 and 142 via public lines 143 or CATV lines.

FIG. 20 shows a communication system configuration enabling such a confrontation-type game. The terminal apparatus 141 is connected to the public lines 143 through a communication device 1412 such as a modem. A display 1413 is connected to an information processing terminal 1411 that is constituted by a personal computer or the like. An input devices (not shown) such as a keyboard are also connected to the information processing terminal 1411.

In an action game, as shown in FIG. 21, it is necessary to display action characters 144 and 145 on the display 1413 and cause those to perform actions such as a kick on a real-time basis.

FIG. 22 shows a process sequence for enabling such an action game through a communication network.

First, one subscriber (assumed here to be subscriber A; terminal apparatus 141) informs, by telephone, another subscriber (assumed here to be subscriber B; terminal apparatus 142) of his intention of starting a game (step (1)). After communication devices of the two subscribers are connected to the public lines 143, the terminal apparatus 141 calls the terminal apparatus 142 to establish a connection (step (2)).

Thereafter, each of the subscribers A and B selects an action character (for instance, 144) provided by software in his information processing terminal 1411. Data of the selected action characters are exchanged by the terminal apparatuses 141 and 142 (steps (3) and (4)).

A game mode is then initiated and a fight is started (step (5)). To finish the game, the terminal apparatus 141 transmits a line disconnection request (step (6)), in response to which the terminal apparatus 142 disconnects the line (step (7)).

Conventionally, as described above, although being identical in employing a communication scheme using character display, the communication service and the action game service are different in nature from each other. That is, the communication service is required to prepare a number of character types because it involves many subscribers. On the other hand, although the action game service is not required to prepare a number of character types, it is required to have a large number of image forms to enable real-time display of actions.

Since the communication service and the action game service are so different in nature, there has been proposed no communication scheme that can process those two types of services in an integral manner.

SUMMARY OF THE INVENTION

The present invention has been made in view of the above problem in the art, and an object of the invention is to provide a network game system which allows subscribers to enjoy, without feeling incongruous, a communication service with communication character display and an action game service with action character display.

In order to realize a network game system that can deal with a communication service mode and an action game service mode in an integral manner, the invention employs the following constitution.

A terminal apparatus comprises display means; input means; communication character data that can be selectively displayed on the display means to perform a conversation with other subscribers through network communication; communication field data commonly used by subscribers who receive a communication service; action character data that can be selectively displayed on the display means to perform an action game with another subscriber through network communication; action field data commonly used by subscribers who receive an action game service; and character transforming means for transforming the communication character to the action character.

A host computer manages communication character data of a subscriber, position data of the communication character, and the communication field data in accordance with an operation that is inputted through the terminal apparatus.

With the above configuration, when the terminal apparatus of a subscriber selects one of the communication characters and one of the action characters, establishes connection to the host computer, and designates a desired communication field, the host computer recognizes that a current mode is the communication service mode and sends, to the terminal apparatus of the subscriber, communication character data of other subscribers existing in the designated communication field and corresponding coordinates data, and the communication character operated by the subscriber and the communication characters operated by the other subscribers are displayed on the display means of each of the terminal apparatuses of the subscriber and the other subscribers in the same communication field, whereby a conversation between the displayed communication characters is enabled based on data that is inputted through the input means.

When the terminal apparatus of the subscriber thereafter expresses, through the input means, an intention of playing a game with any of the other communication characters existing in the same communication field, the terminal apparatus of the subscriber recognizes transition to the action game service mode and transforms communication character to the previously selected action character by activating the character transforming means.

As described above, an opponent of a game is searched for in the conventional communication character service. Upon determination of an opponent, the communication character is transformed into the action character. As a result, the subscriber is subjected to transfer from the communication service mode to the action game service mode without feeling incongruous. If the character transformation is effected by using a morphing technique, the game can be made more enjoyable.

DETAILED DESCRIPTION OF THE PREFERRED EMBODIMENTS

Embodiment 1

Figure 1:
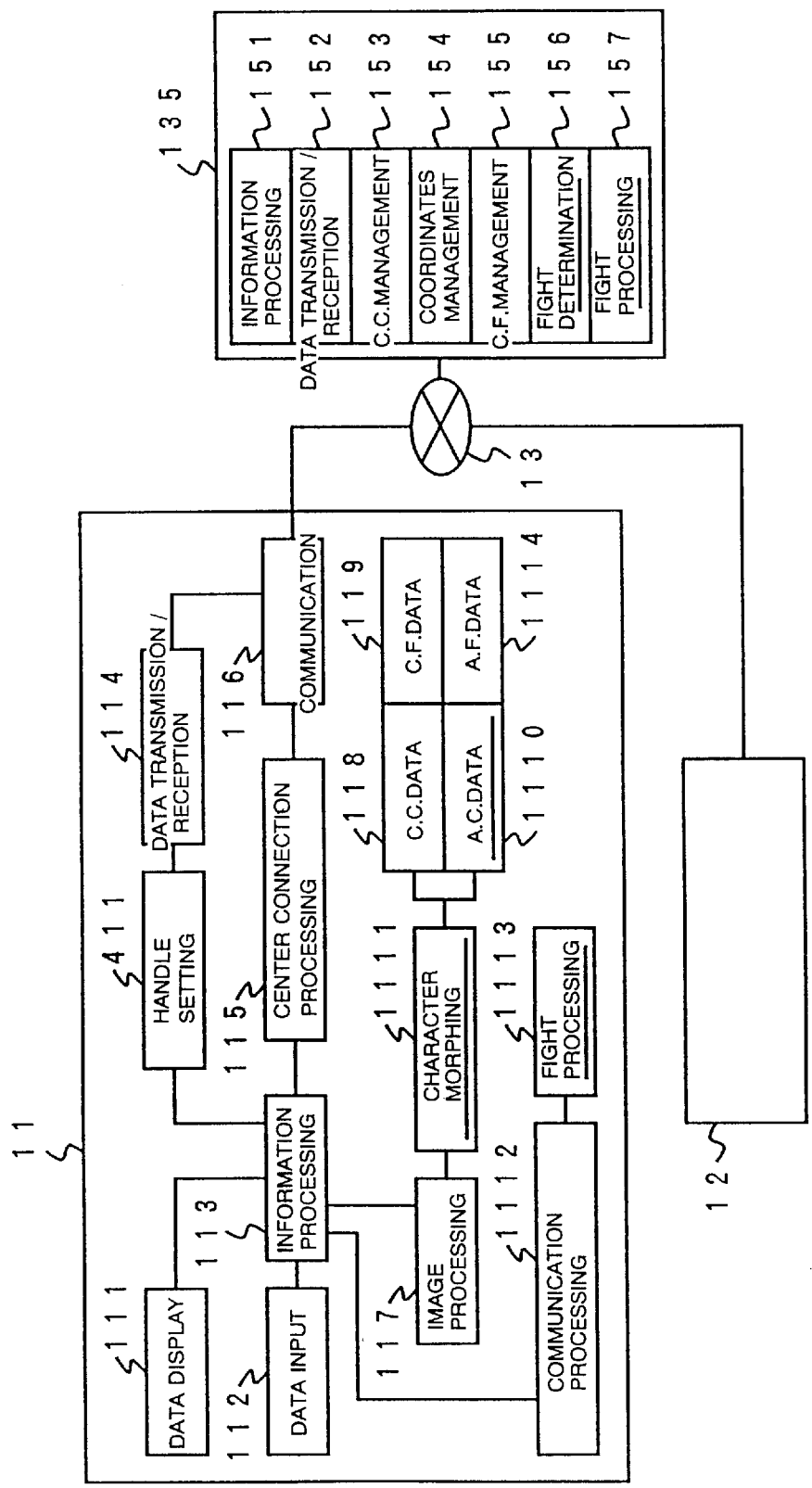
FIG. 1 shows a functional configuration of Embodiment 1 of the present invention.
Figure 17:
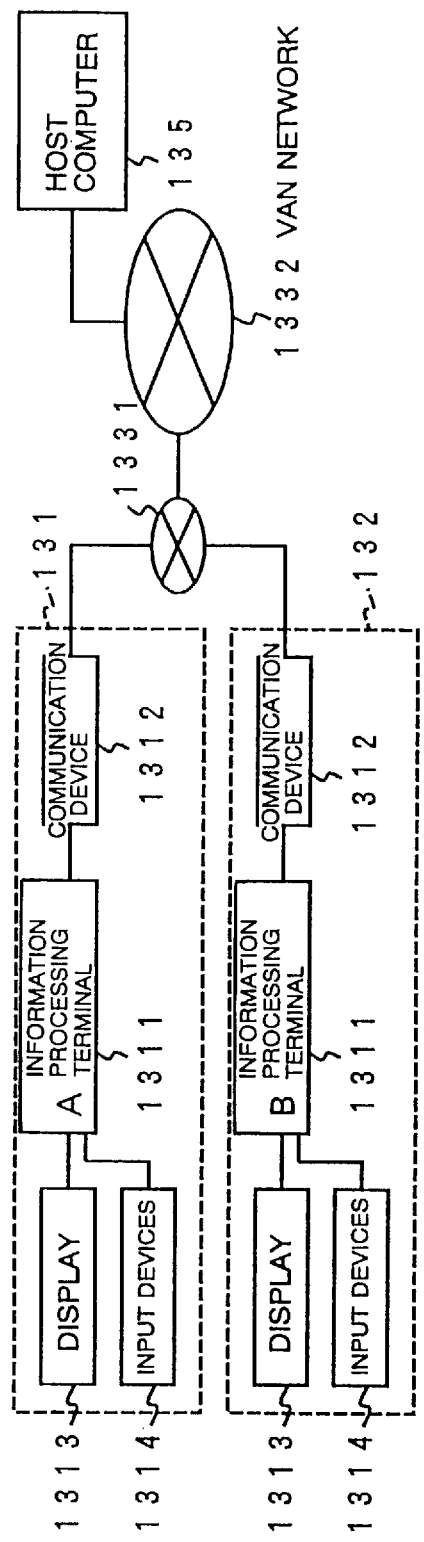
FIG. 17 shows a system configuration of a game communication service.

FIG. 1 is a functional block diagram showing an embodiment of the present invention. Since the hardware configuration of this embodiment is the same as that of FIG. 17, it is not described here.

A subscriber A terminal apparatus 11 has, as the main function, an information processing function 113 that is implemented by a microprocessor. The terminal apparatus 11 also has a data display function 111 that is implemented by a display 1313, a data input function 112 that is implemented by input devices 1314, a center communication function 116 that is implemented by a communication device 1312, and other functions.

The terminal apparatus 11 also has action character data 1110, communication character data 118, communication field data 119, and other data which are implemented by software data and stored in a storage means.

The terminal apparatus 11 further has an image processing function 117, a center connection processing function 115, a character morphing function 1111, a communication processing function 1112, and a fight processing function 1113 all of which are implemented by software programs.

Although not shown in FIG. 1, similar functions are provided in a subscriber B terminal apparatus 12.

The center, which is implemented by a host computer 135, has an information processing function 151 which is implemented by a microprocessor, and is the main function. The center also has a data transmission/reception function 152, a communication character management function 153, a coordinates management function 154, a communication field management function 155, a fight determination function 156, and a fight processing function 157.

Figure 5:
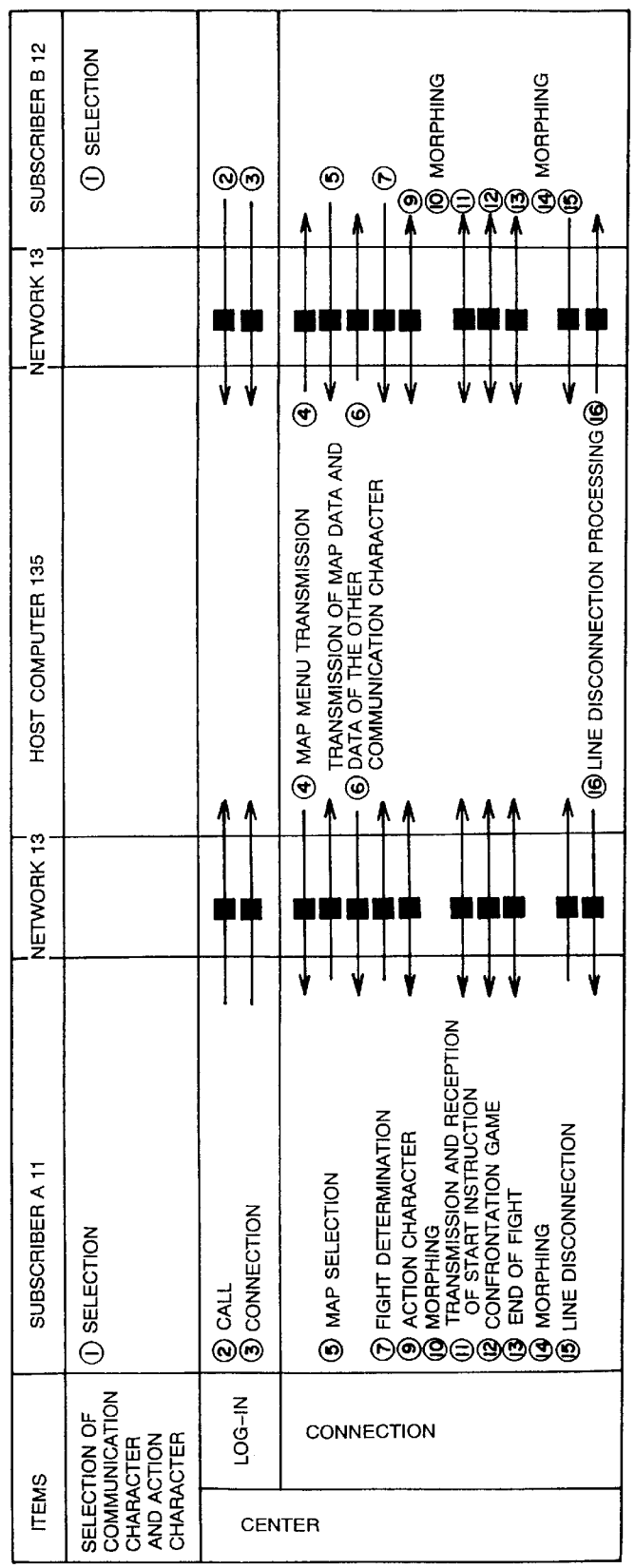
FIG. 5 shows a process sequence in Embodiment 1 of the invention.

Next, with reference to FIG. 5, there will be described a sequence in which subscriber A receives a communication service together with subscriber B by accessing the host computer 135, and the service then transfers to an action game service. All of numerals encircled in FIG. 5 will be parenthesized in the following description (for instance, 1 will be replaced by (1)).

Figure 2:
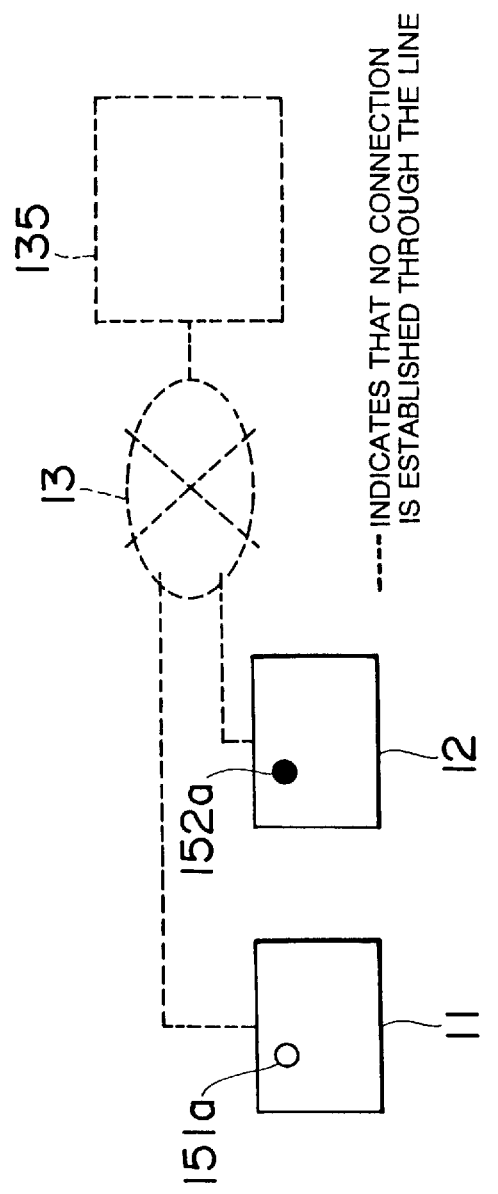
FIGS. 2 to 4 illustrate connection states in Embodiment 1.

First, subscriber A causes the communication character data and the action character data of his own terminal apparatus 11 to be displayed on the display 1313, and selects one communication character and one action character from among the displayed characters (step (1)). FIG. 2 shows this state conceptually. In FIG. 2, the subscriber A terminal apparatus 11 and the subscriber B terminal apparatus 12 select communication characters 151a and 152a, respectively, in an off-line state (no connection to lines is established).

Subscriber A then activates the communication function 116 and calls the host computer 135 via a network 13 (step (2)). It is assumed that before or after this calling, subscriber B also calls the host computer 135 from his own terminal apparatus 12.

After connection is established (step (3)), the host computer 135 serving as the center transmits map menus of the respective fields (areas) to the respective subscriber terminal apparatuses 11 and 12 by using the communication field management function 155 (step (4)).

Each subscriber who has received the map menus selects an arbitrary map (i.e., a field in which to display his own communication character 151a) based on the communication field data 119 in his own terminal apparatus 11 or 12, and transmits an instruction of the selection to the host computer 135 through the communication function 116 (step (5)).

Figure 3:
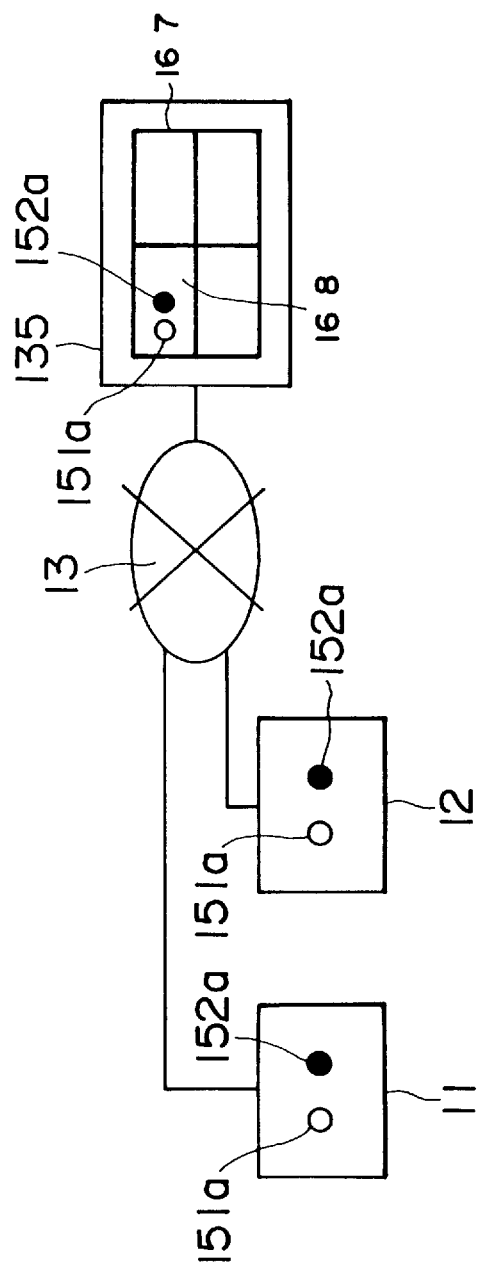
Figure 4:
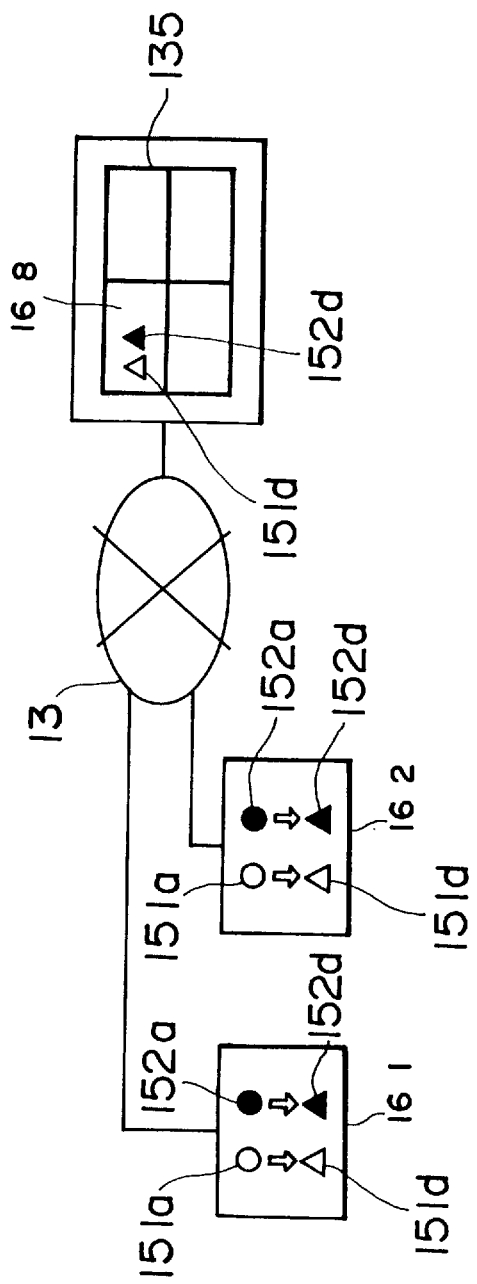

By using the communication character management function 153, the coordinates management function 154, and the communication field management function 155, the host computer 135 transmits data of a selected field (map) 168, the data of a character and coordinates of another subscriber (subscriber B in this example) existing in the field 168 to the subscriber A terminal apparatus 11 as well as to the subscriber B terminal apparatus 12 (step (6)). FIG. 3 shows this state conceptually. In FIG. 3, the data of the communication characters 151a and 152a existing in the field 168 of the host computer 135 are transmitted to the terminal apparatuses 11 and 12 in similar manners.

Figure 18:
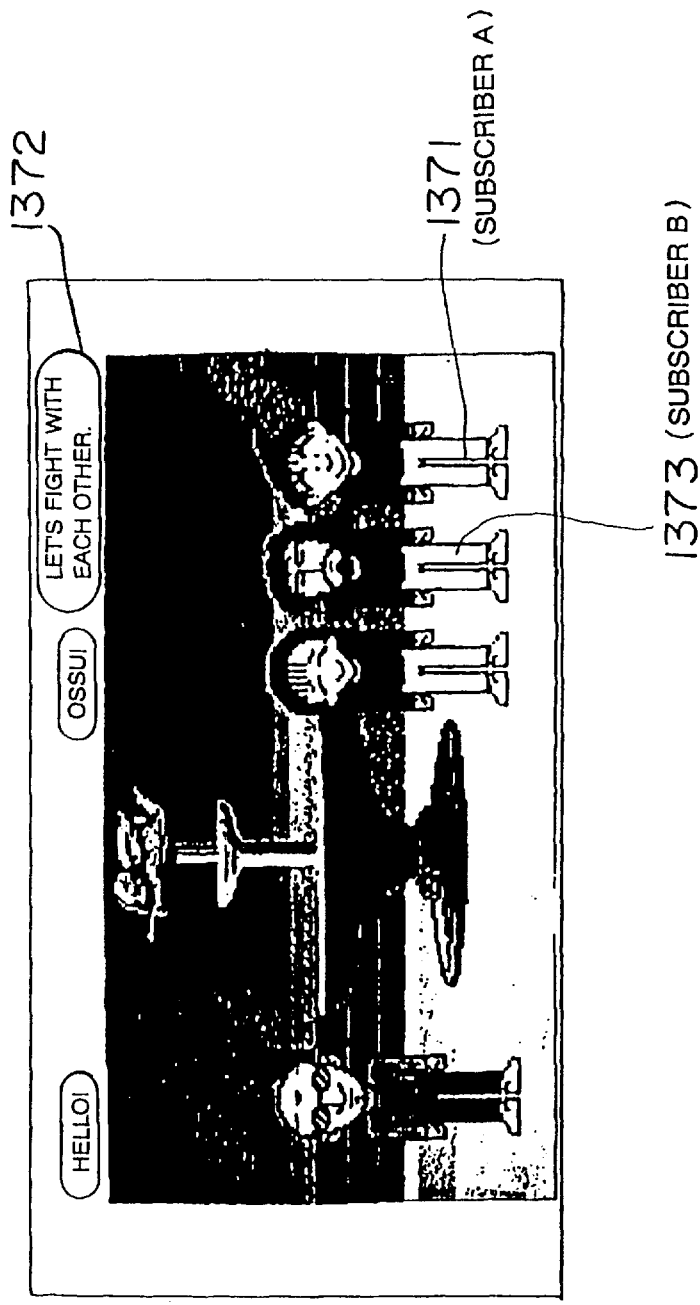
FIG. 18 shows an example of a displayed picture of the game communication service.
Figure 19:
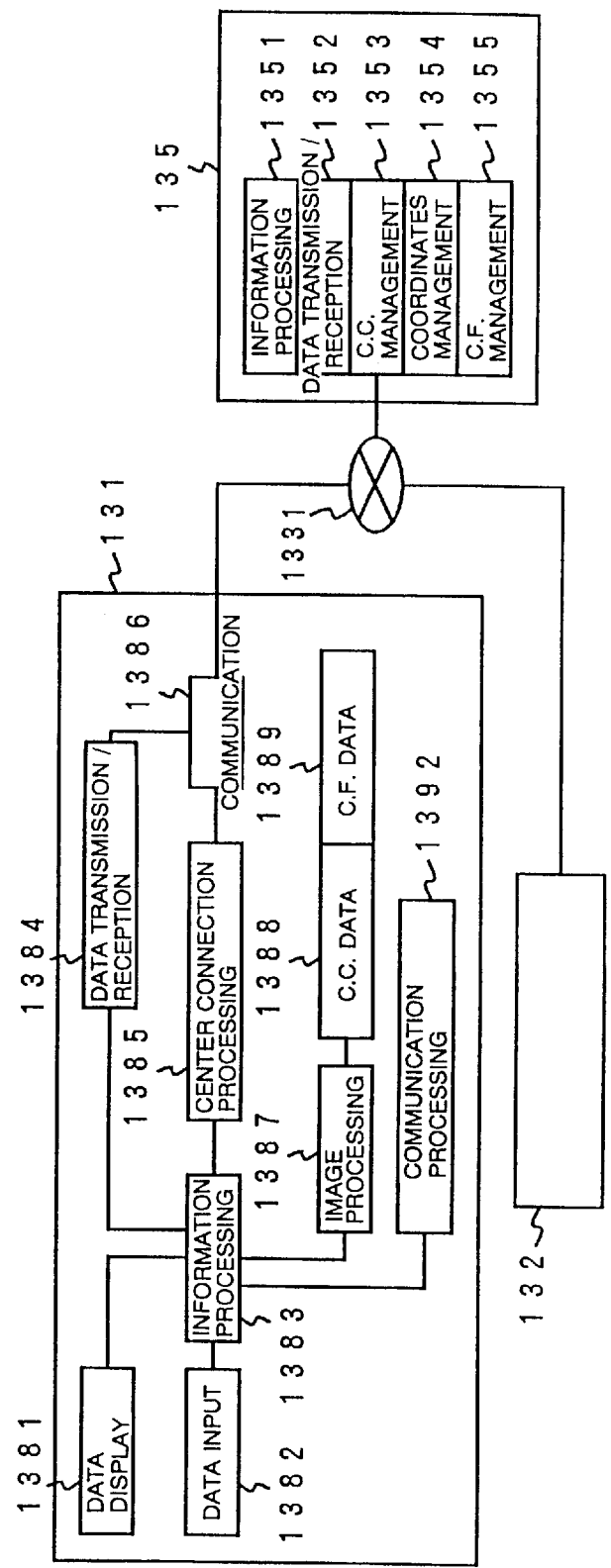
FIG. 19 shows functional configurations to implement the game communication service.
Figure 20:
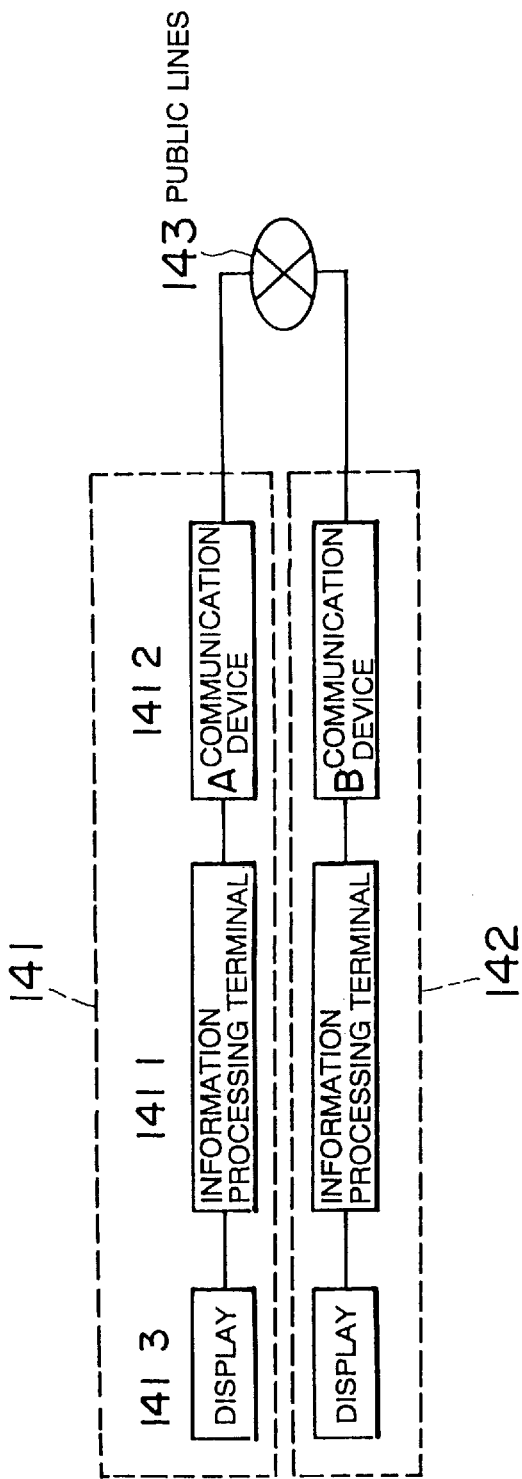
FIG. 20 shows a communication system configuration for a confrontation-type action game.
Figure 21:
FIG. 21 shows an example of display of an action game.
Figure 22:
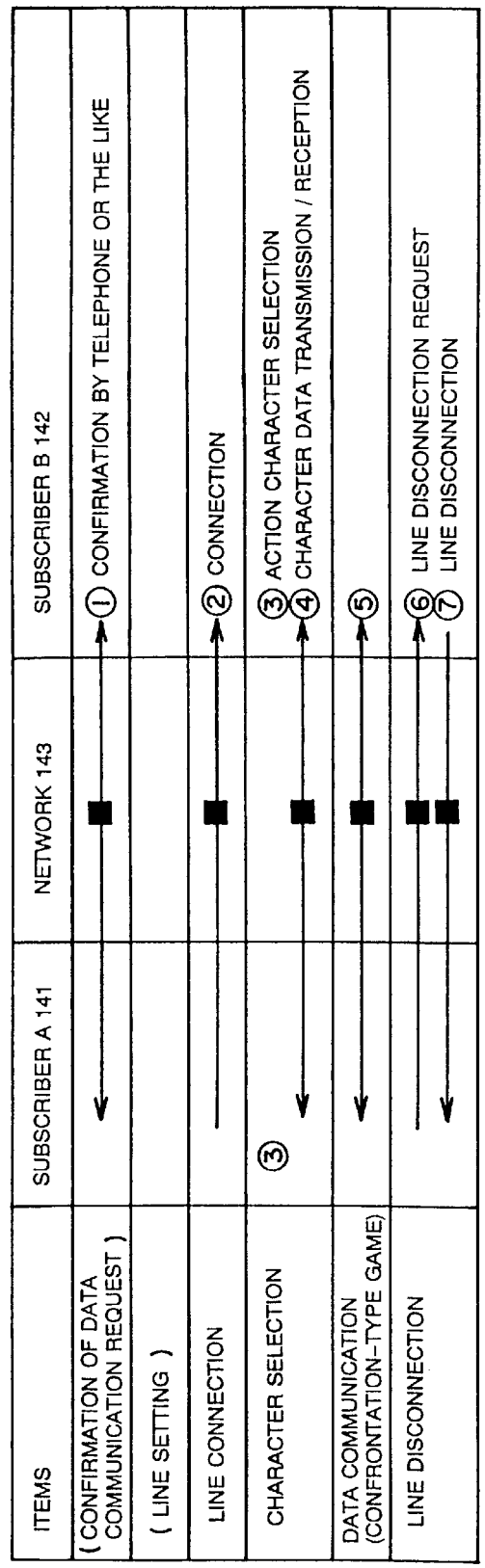
FIG. 22 is a process sequence for enabling an action game to be performed through a communication network.
Figure 23:
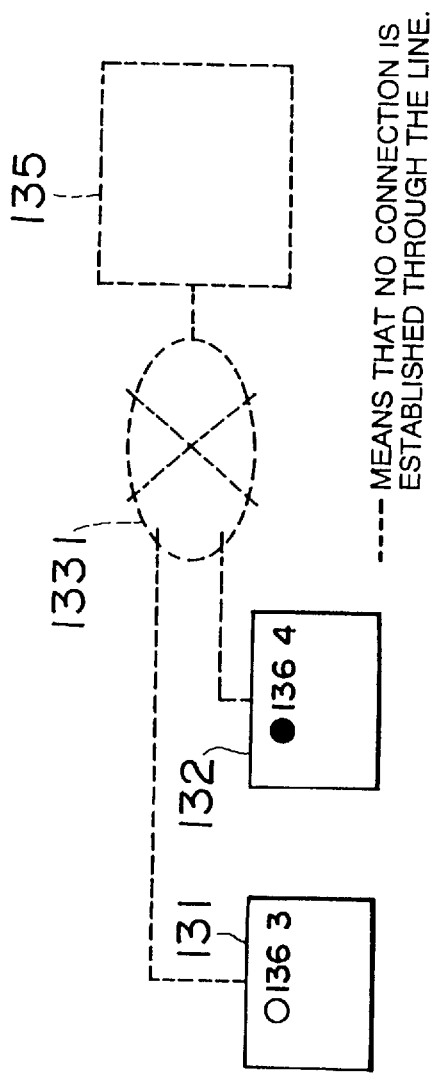
FIGS. 23 and 24 show connection states of the game communication service.
Figure 24:
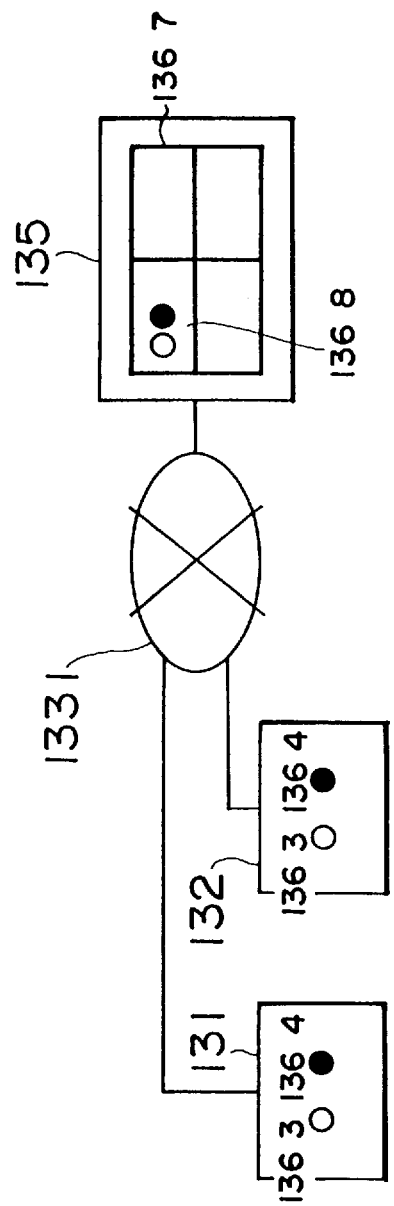
Figure 25:
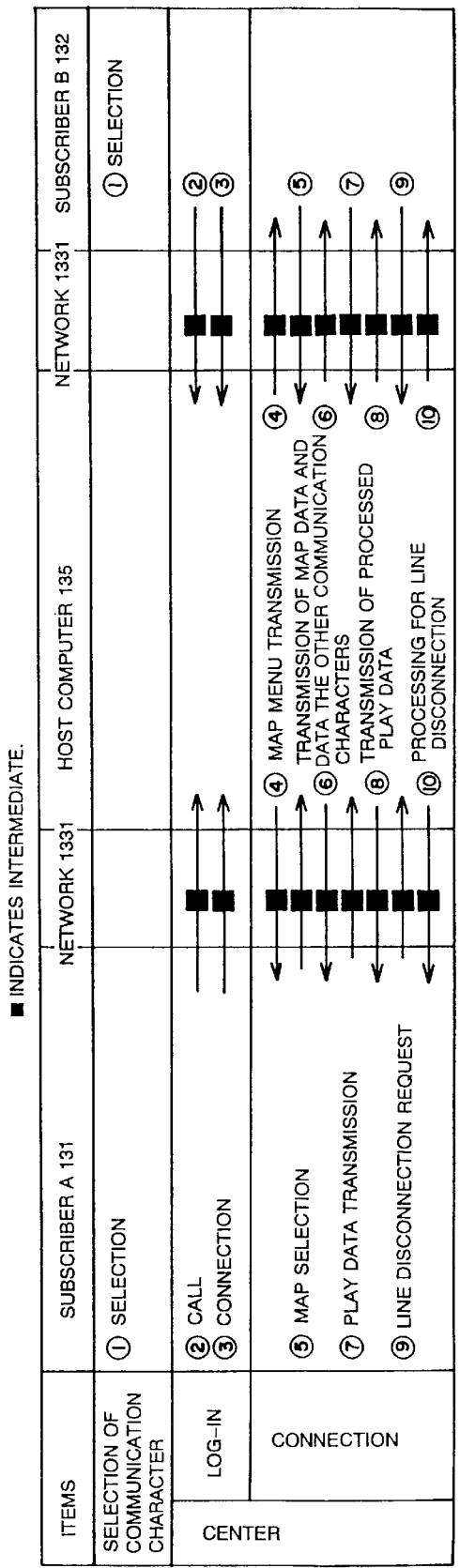
FIG. 25 is a sequence diagram showing a process of the game communication service.

A communication character service is established in this state. Displayed images on the respective terminal apparatuses 11 and 12 are as shown in FIG. 18.

Then, in the communication character service mode, the subscriber of the terminal apparatus 11 starts to converse with other communication characters (by inputting characters through the keyboard) by means of the communication processing function 1112 while causing his communication character to move from one field 168 to another by manipulating the keyboard, pad, etc.

When two communication characters of subscribers who want to do a confrontation game meet with each other and their intentions of transition to a game mode are mutually recognized by those subscribers through a conversation that is effected by inputting of characters through the keyboards, a fight determination instruction is transmitted to the host computer 135 by means of the communication function 116 (step (7)). Upon reception of the fight determination instruction, the host computer 135 not only activates the fight determination function 156, but also activates the communication field management function 155 to instruct the terminal apparatuses 11 and 12 of subscribers A and B to effect a change from the communication field background image to an action field background image.

Figure 26:
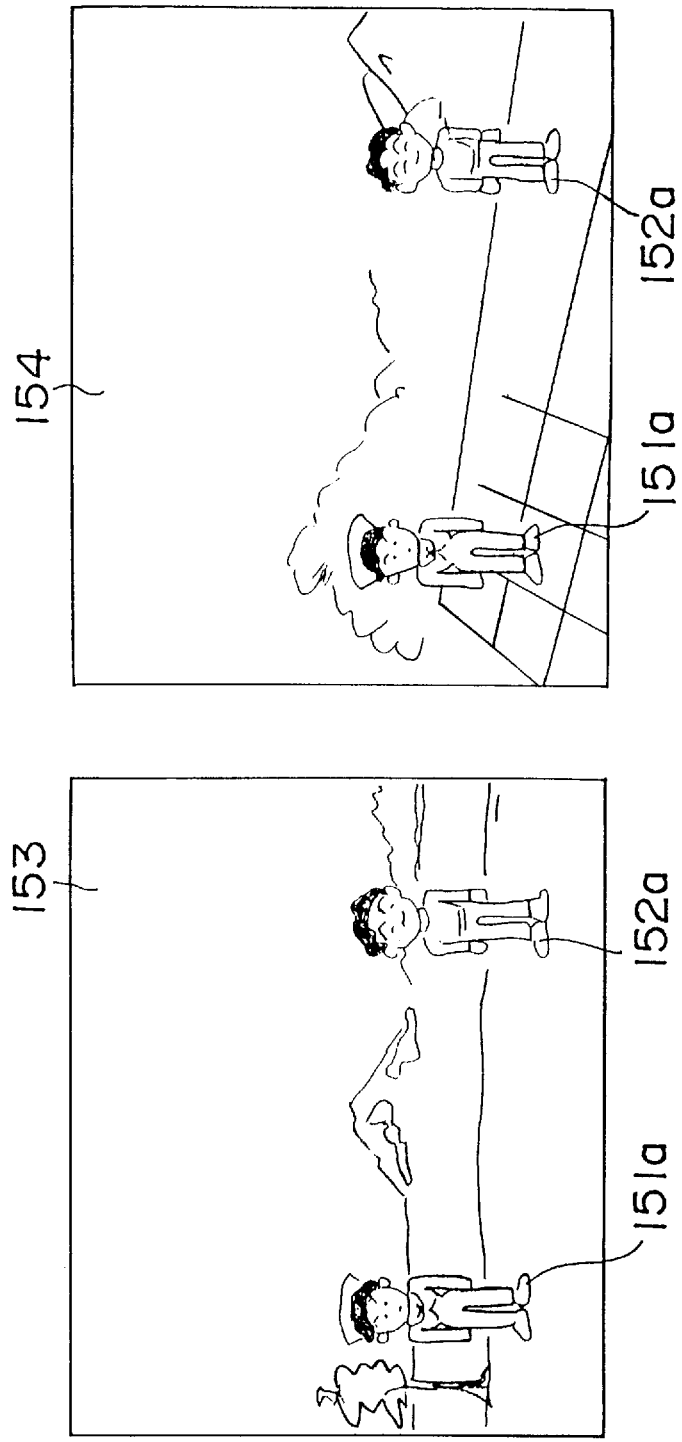
FIG. 26 illustrates how a background image is changed in Embodiment 1.

Each of the terminal apparatuses 11 and 12 displays the background image as specified by the host computer 135 on the display 1313 through the data display function 111 by activating the action field data function 1114. FIG. 26 illustrates shows how a background image is changed. In FIG. 26, a background image 153 of the communication service mode is replaced by a background image 154 of the action game service mode while the communication character 151a operated by subscriber A and the communication character 152a operated by subscriber B remain as they are.

Then, the action character data function 1110 is activated in the subscriber A terminal apparatus 11, whereby an action character to be operated by himself (subscriber A) in the confrontation game is selected. Data of the selected action character is forwarded to the opponent (subscriber B) terminal apparatus 12 via the host computer 135 (step (9)).

Subsequently, the character morphing function 1111 is activated in the terminal apparatus 11 (step (10)). The character morphing function 1111 serves to visually transform the communication character 151a into an action character 151d in link with the image processing function 117 (see FIG. 27). Morphing intermediate images (151b and 151c in FIG. 27) are registered as moving images in the character morphing function 1111. The morphing intermediate images are used universally irrespective of the kind of starting image, i.e., communication character 151a and the kind of final image, i.e., action character 151d.

That is, the same intermediate images are used whatever communication character and action character the subscriber has selected. Therefore, it is not necessary to prepare morphing intermediate images for every conceivable combination of a communication character and an action character.

In this embodiment, since communication characters are displayed in a relatively small size and action characters are displayed in a large size (see FIG. 27), a sufficient visual effect of transformation from a communication character to an action character can be obtained when the intermediate images 151b and 151c are displayed dynamically if there are used, as the intermediate images 151b and 151c, moving images that are blurred images of a person and gradually increase in size.

Similarly, the opponent (subscriber B) communication character 152a is also transformed into an action character 152d via intermediate images 152b and 152c.

Figure 28:
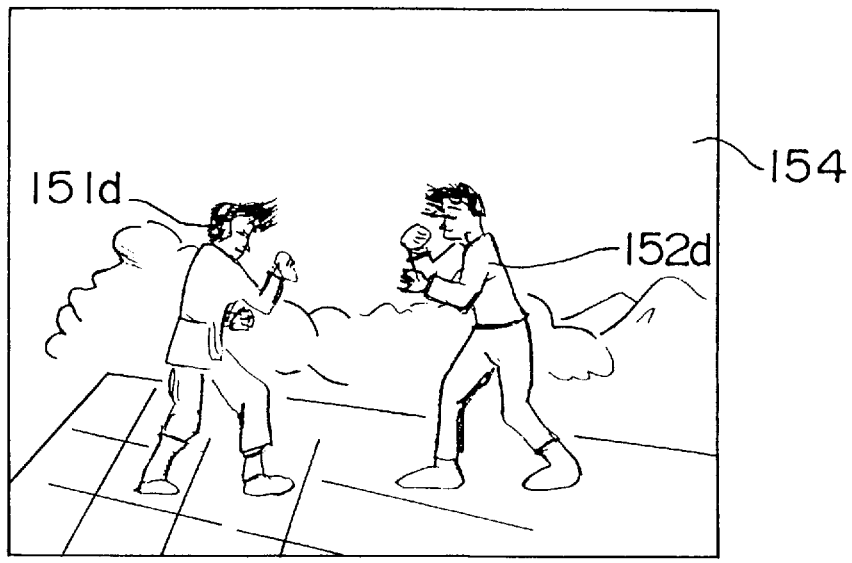
FIG. 28 illustrates a displayed image appearing on a display after transition to an action game service.

FIG. 28 shows a displayed image on the display 1313 appearing after the transition to the action game service.

When the preparation for starting a game between subscribers A and B has been completed, a game start instruction is made through the input devices 1314 such as the keyboard or pad (step (11)). Upon reception of the game start instructions from both subscribers, the host computer 135 effects transition to the action game service mode.

In the action game service mode, the fight processing function 157 of the host computer 135 is activated, whereby a manipulation signal of the input devices 1314 is sent from the terminal apparatus (for instance, terminal apparatus 11) of one subscriber (for instance, subscriber A) to the terminal apparatus (for instance, terminal apparatus 12) of the opponent subscriber (for instance, subscriber B).

For example, when one action character 151d is so operated as to kick the other action character 152d, a kick manipulation signal is sent from the terminal apparatus 11 to the opponent terminal apparatus 12 via the host computer 135. The fight processing function 157 calculates damage etc. of the character 152d due to the kick operation, and informs the terminal apparatus 12 of a calculation result. The terminal apparatus 12 determines an action of the character 152d in accordance with the damage. The terminal-side fight processing function 1113 receives and stores the data from the fight processing function 157 of the host computer 135.

The game is continued in the above manner. When the game is finally finished and a game end instruction is sent from the terminal apparatus 11 or 12 to the host computer 135 (step (13)), the host computer 135 instructs each of the terminal apparatuses 11 and 12 to activate the character morphing function 1111.

Figure 27:
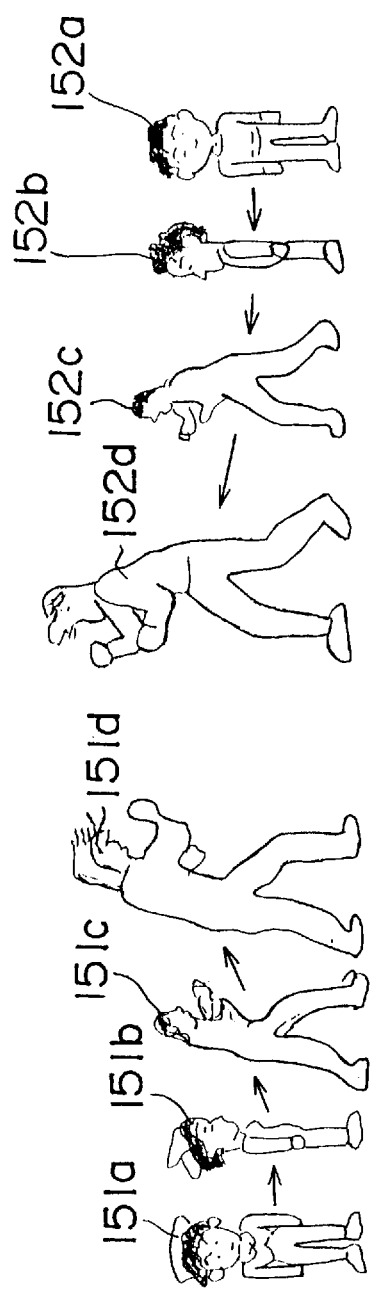
FIG. 27 illustrates how a communication character is transformed.

When the character morphing function 1111 is activated, the action character 151d is transformed into (i.e., returned to) the communication character 151a (step (14)), which morphing is opposite in direction to the morphing illustrated in FIG. 27. The character morphing function 1111 may effect this morphing by reversely reproducing the above-described moving image data 151b→151c or by preparing another moving image data of the opposite morphing direction.

The communication character service mode is restored in this manner. Upon reception of a line disconnection request from the terminal apparatus 11 (step (15)), the host computer 135 performs line disconnection processing (step (16)) and the service is finished.

While in Embodiment 1 the background image is changed from the communication field 153 to the action game field 154 before the morphing processing, the background image (field image) may be changed in synchronism with the morphing processing, that is, the transformation from the communication character 151a to the action character 151d.

While in the above description an action character is selected prior to the communication, the system may be adapted to allow selection of an action character to be made at the time when an opponent is determined in the communication character service mode.

The data transmission/reception function 114 may be given a handle setting function 411 so that an opponent can be identified by the handle name in the communication character service mode. The handle name is a nickname (expressed by a character string) for identifying a character which nickname is valid on a personal computer communication system.

Figure 9:
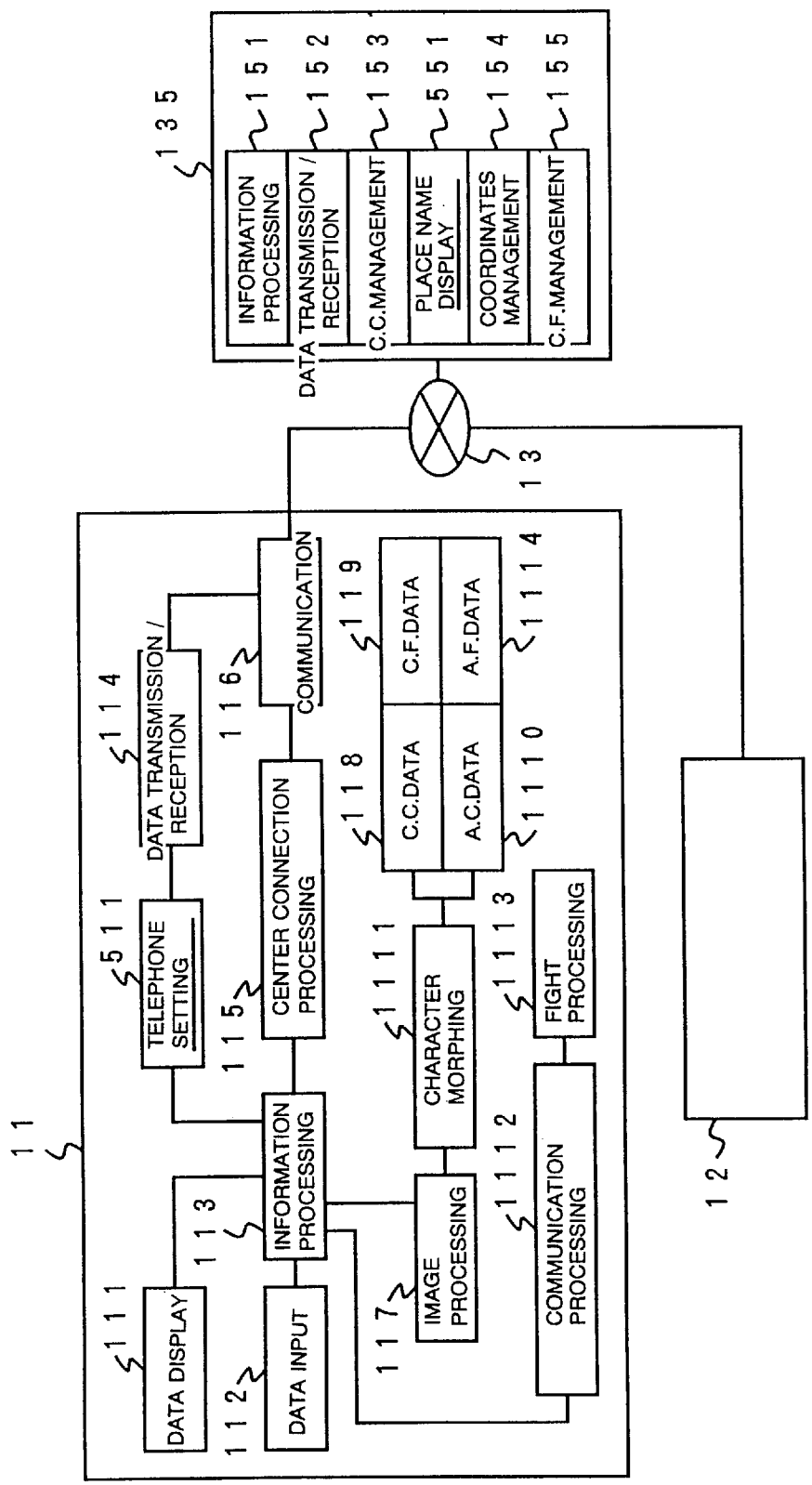
FIG. 9 shows a functional configuration of a modification of Embodiment 1 of the invention.

As shown in FIG. 9, the system may be modified such that the data transmission/reception function 114 is given a telephone setting function 511 instead of the handle setting function 411, and that the telephone number of the subscriber himself (subscriber A) is transmitted to the host computer 135 as data for identifying the character 151a. In this case, the host computer 135 may display the telephone number itself in association with a character being displayed on the screen. Alternatively, a place name display function 551 may be provided in the host computer 135 so that a subscriber is identified by a place name (for instance, Mr. Shinagawa or Mr. Kawasaki) of an area corresponding to first several digits of the telephone number. Where a place name is displayed, it is easier to recognize from what area an opponent is accessing.

Figure 10:
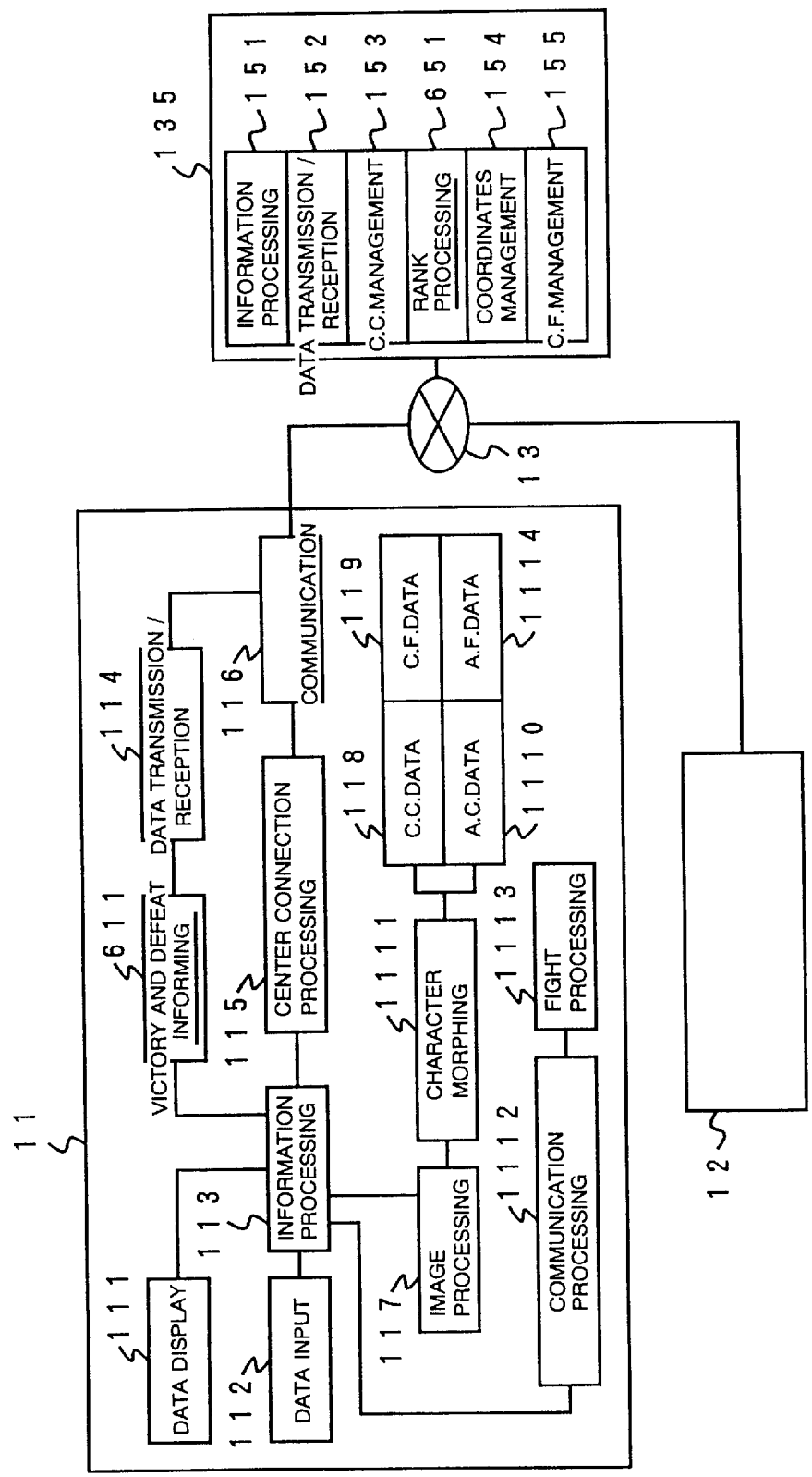
FIG. 10 shows a functional configuration of another modification of Embodiment 1 of the invention.

Further, as shown in FIG. 10, a victory and defeat informing function 611 may be provided in the terminal apparatus 11 so that the host computer 135 is informed of a record of past victories and defeats of subscriber A. In this case, a rank processing function 651 may be provided in the host computer 135. The rank processing function 651 may be so constructed as to update the ranks of the respective subscribers, to allow the subscriber names to be displayed separately for the respective ranks in a communication field picture as a material to be used in judging an opponent to fight with. Different fields may be used for the respective ranks.

Embodiment 2

Figure 6:
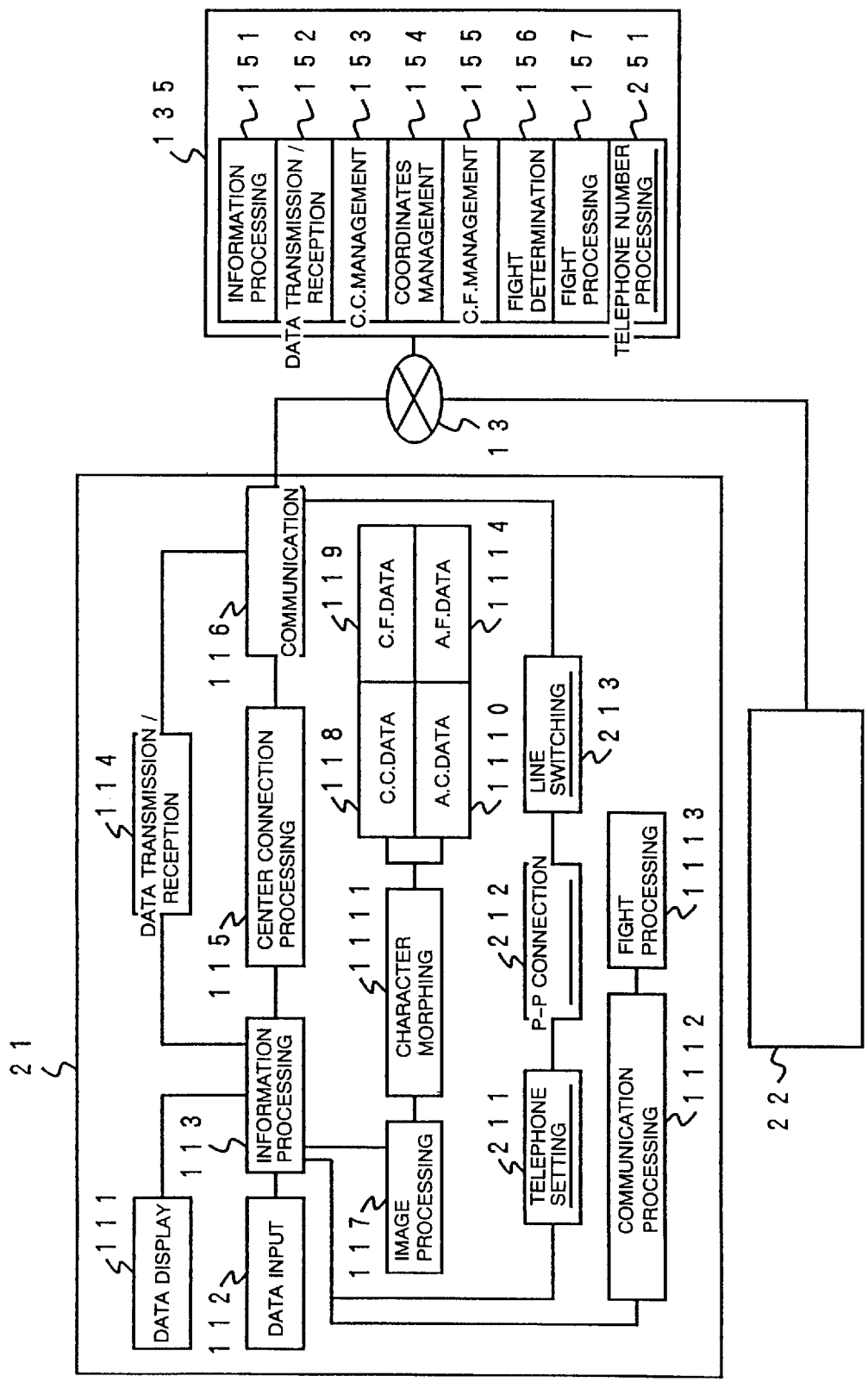
FIG. 6 shows a functional configuration of Embodiment 2 of the invention.
Figure 7:
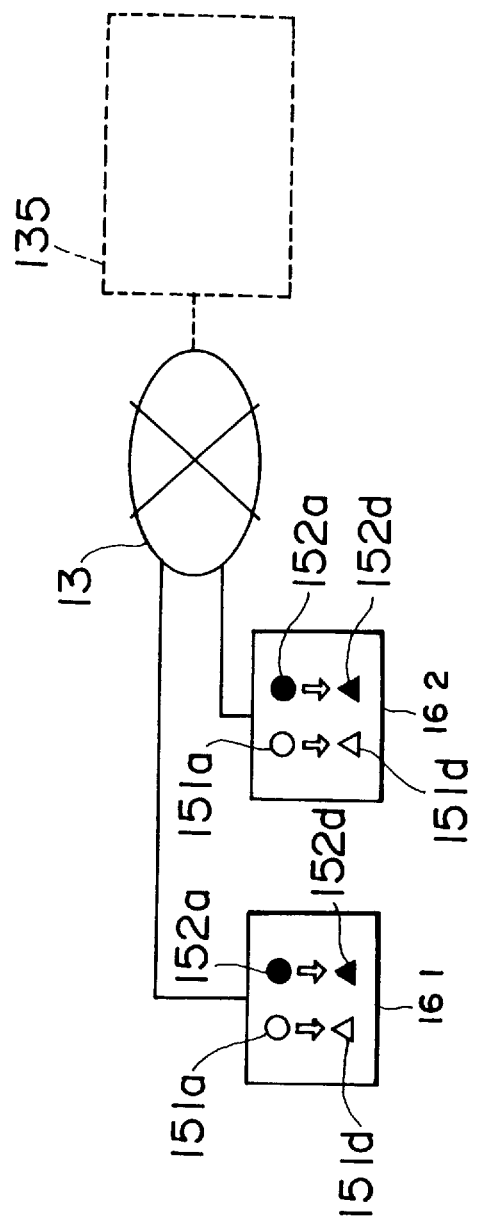
FIG. 7 illustrates a connection state in Embodiment 2 of the invention.
Figure 8:
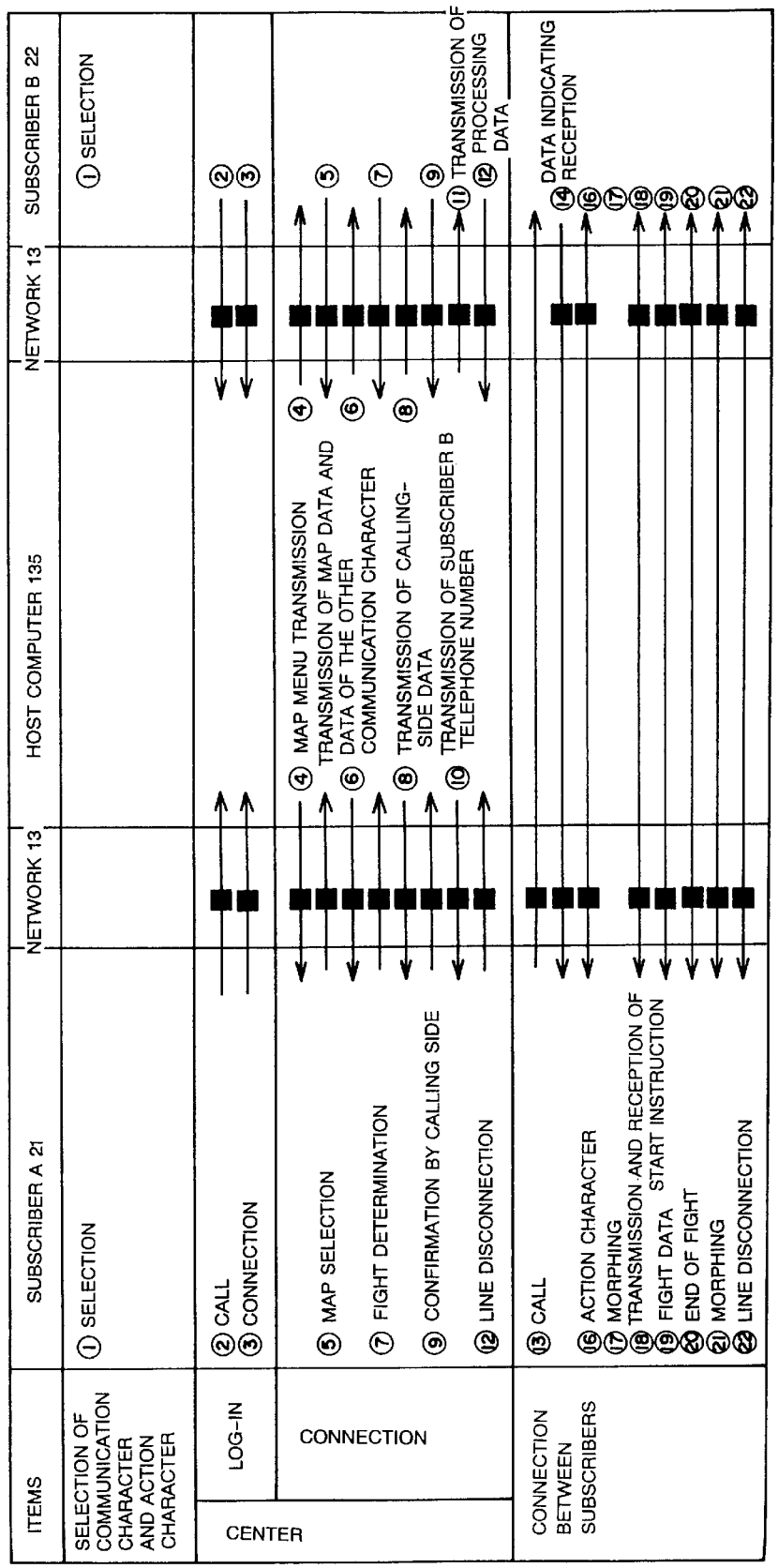
FIG. 8 shows a process sequence in Embodiment 2 of the invention.

FIGS. 6 to 8 show another embodiment of the invention. The components in these figures and the figures of Embodiment 1 having similar functions are given the same reference numerals and explanations therefor will be omitted.

The main feature of this embodiment is that in transition from a communication character service mode to an action game service mode, the host computer 135 disconnects the line, and a game is played by terminal apparatuses 21 and 22 that are directly connected to each other.

As shown in FIG. 6, a telephone setting function 211, a two places connecting function 212, and a line switching function 213 are added in the terminal apparatus 21. The telephone setting function 211 is a function of storing a telephone number of a subscriber (in this embodiment, terminal apparatus 22) with whom a game is to be played. The two places connecting function 212 is a function of performing processing for telephone line connection between the terminal apparatus 21 and the other terminal apparatus (terminal apparatus 22). The line switching function 213 is a function of switching between a connection to the host computer 135 and a connection to the other terminal apparatus (terminal apparatus 22).

A telephone number processing function 251 is added in the host computer 135.

FIG. 8 shows a sequence of a process executed by the terminal apparatuses 21 and 22 and the host computer 135 according to this embodiment. In FIG. 8, the steps of selecting characters (step (1)), establishing connection to the host computer 135 (steps (2) and (3)), and transferring to a communication service mode and performing fight determination processing (steps (4) to (7)) are the same as those in the process of FIG. 5.

In this embodiment, upon reception of a fight determination instruction, the host computer 135 activates the telephone number processing function 251 to return, to the terminal apparatuses 21 and 22, calling-side data that indicates from which of the terminal apparatuses 21 and 22 the next connection between the terminal apparatuses is effected (step (8)).

If the terminal apparatus 21 is designated as a terminal apparatus for performing calling processing and subscriber A confirms his intention of calling (step (9)), the terminal apparatus 21 is informed of a telephone number of subscriber B by the host computer 135 and stores it by means of the telephone setting function 211 (step (10)). The subscriber B terminal apparatus 22 is also informed of the fact that the next calling is performed by subscriber A (step (11)).

The line is temporarily disconnected in this state (step (12)), and communication between the host computer 135 and each of the terminal apparatuses 21 and 22 is finished. A displayed image in the communication service mode is kept displayed on the screen even after the termination of the connection to the host computer 135.

Thereafter, the line switching function 213 activates the telephone setting function 211 to thereby read the telephone number of subscriber B (opponent) terminal apparatus 22, and then activates the two places connecting function 212 to thereby call the subscriber B terminal apparatus 22 via the network 13 (step (13)).

Upon completion of the connection processing (step (14)), the respective action character data 1110 are exchanged by the terminal apparatuses 21 and 22, whereby the communication characters 151a and 152a kept displayed on the screen are transformed into action characters 151d and 152d by morphing processing (step (17)). FIG. 7 shows this state.

Subsequently, a game is started by interterminal communication, and the line is disconnected when the game is finished (steps (18) to (22).

As described above, in this embodiment, the host computer 135 provides only a service of the communication character service mode. Upon finding of an opponent with whom a game is to be played, the host computer 135 cancels the connection. Thereafter a game is played by the terminal apparatuses 21 and 22 that are directly connected to each other. Since an opponent can be found by utilizing the communication character service, selection can be made from among a number of subscribers in accordance with the subscriber's skill in a game. Further, since no load is imposed on the host computer 135 after start of a confrontation game, the host computer 135 can be operated efficiently.

Figure 11:
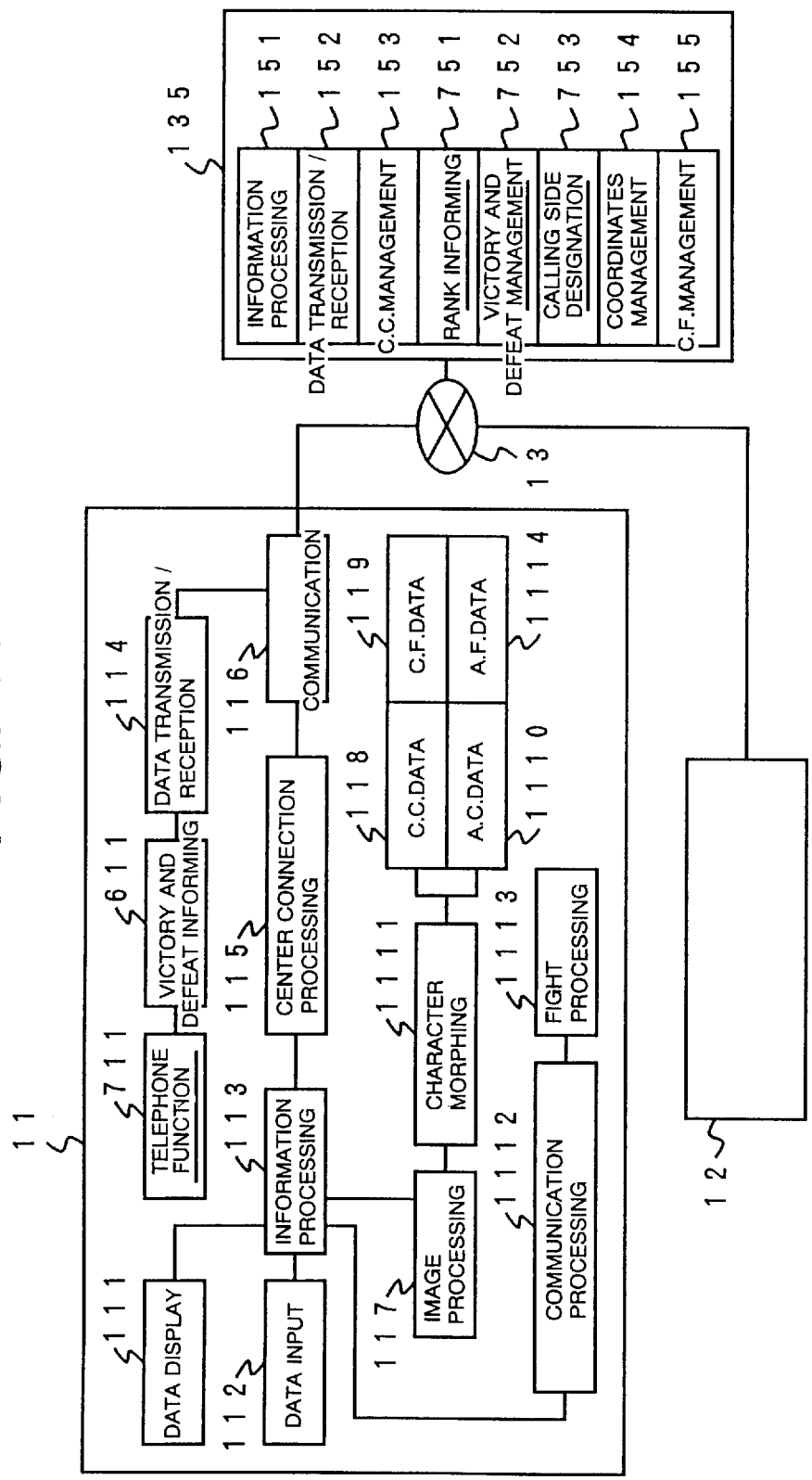
FIG. 11 shows a functional configuration of a modification of Embodiment 2 of the invention.

FIG. 11 shows a functional configuration of a modification of this embodiment. In FIG. 11, the host computer 135 is provided with a victory and defeat management function 752 for managing ranks or victory and defeat results of the respective subscribers, as well as a rank informing function 751 for informing terminal apparatuses of the respective subscribers. When a subscriber has decided to do a fight in consideration of the rank and winning percentage of an opponent in the communication character service mode, a calling side designating function 753 of the host computer 135 sends data indicating a calling-side subscriber to the terminal apparatus 21.

In response to the calling instruction sent from the host computer 135, a telephone function 711 of the terminal apparatus 11 calls the opponent terminal apparatus 22 to conduct a connect operation.

Figure 13:
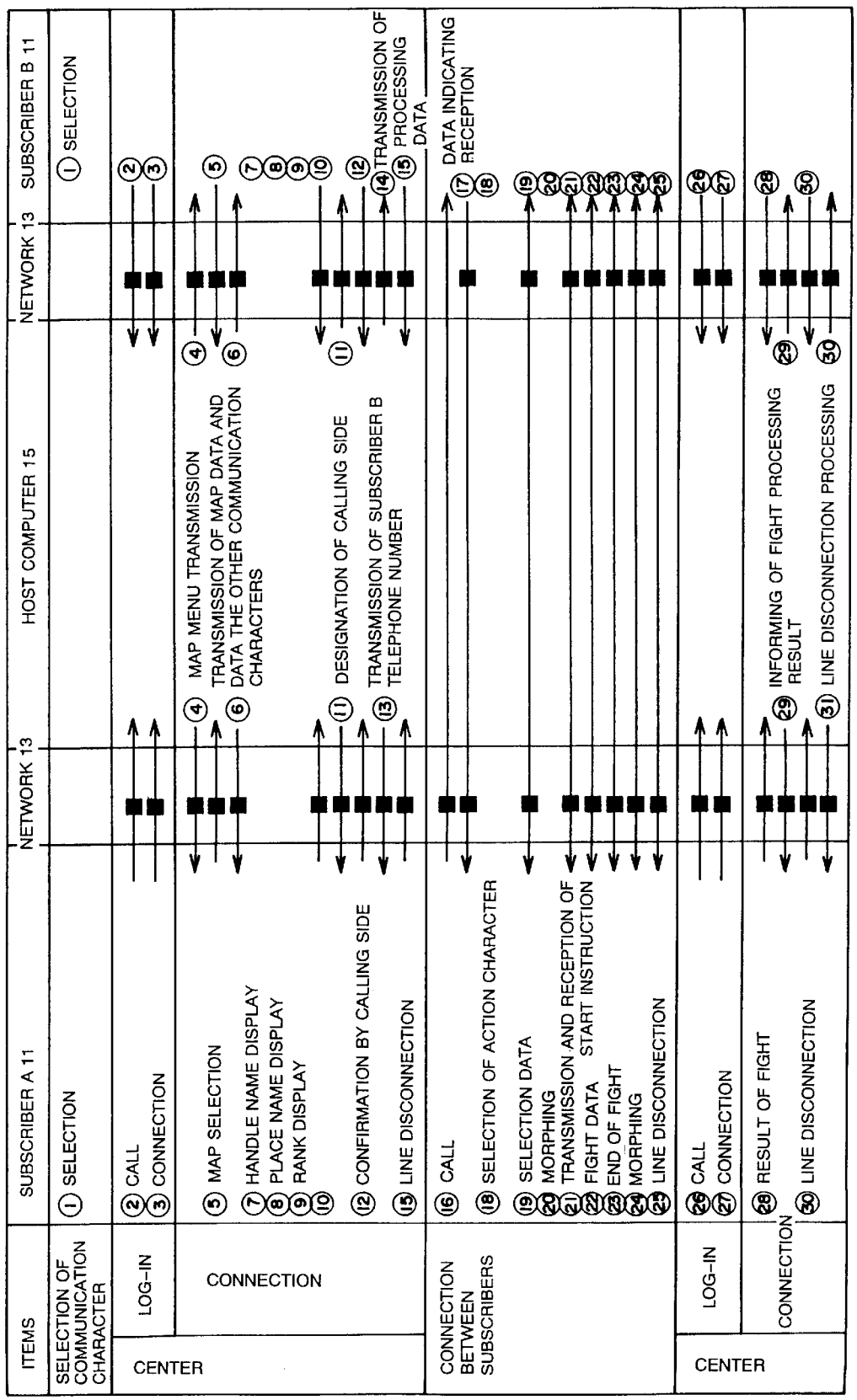
FIG. 13 shows another process sequence in Embodiment 2 of the invention.

As shown in FIG. 13, the system may be adapted such that upon completion of a fight between the terminal apparatuses 21 and 22, connection to the host computer 135 is again established, and the host computer 135 is informed of a result of the fight so as to be able to process it.

Figure 14:
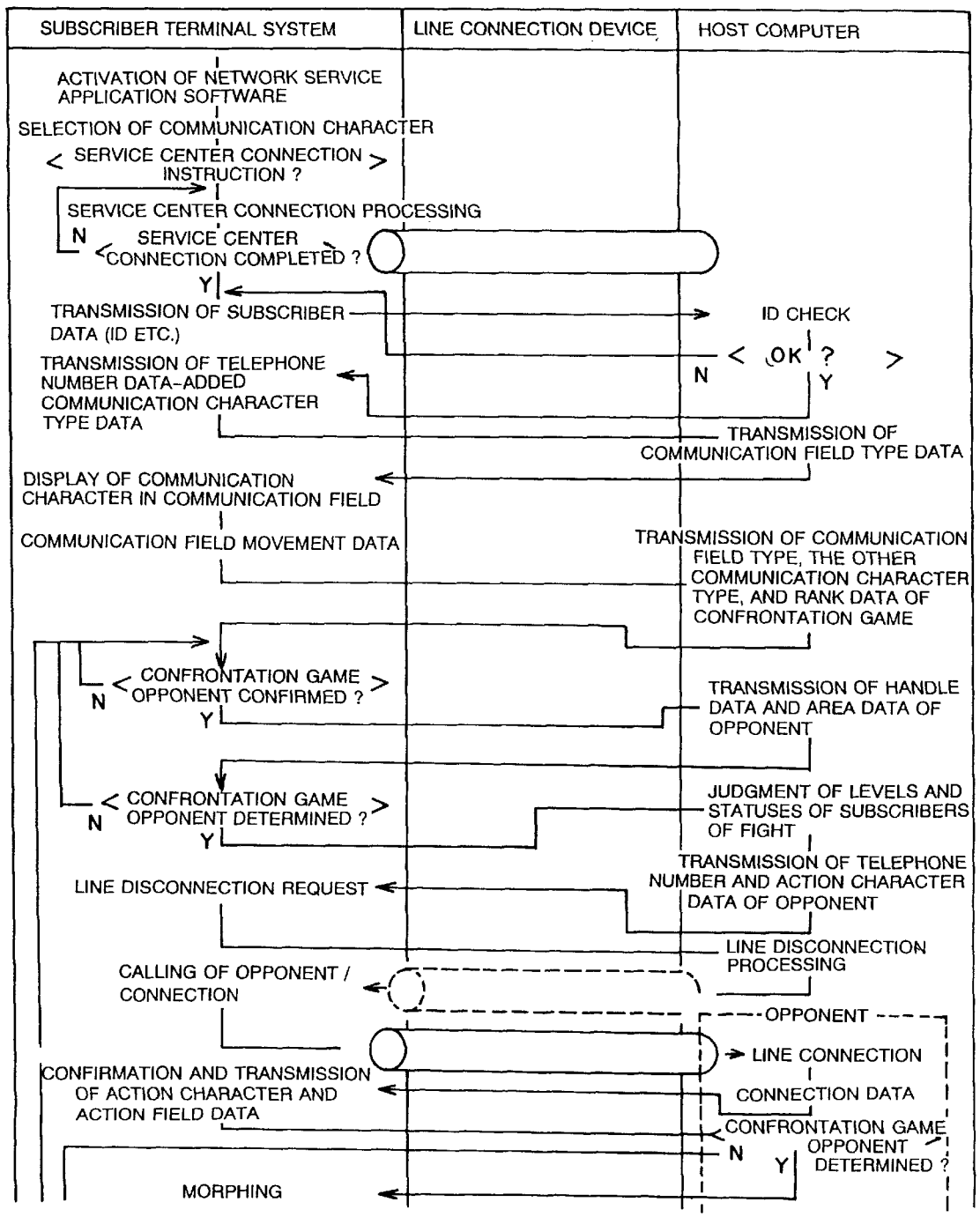
FIGS. 14 to 16 shows a detailed version of the process sequence of FIG. 13 in connection with a subscriber A terminal apparatus.
Figure 15:
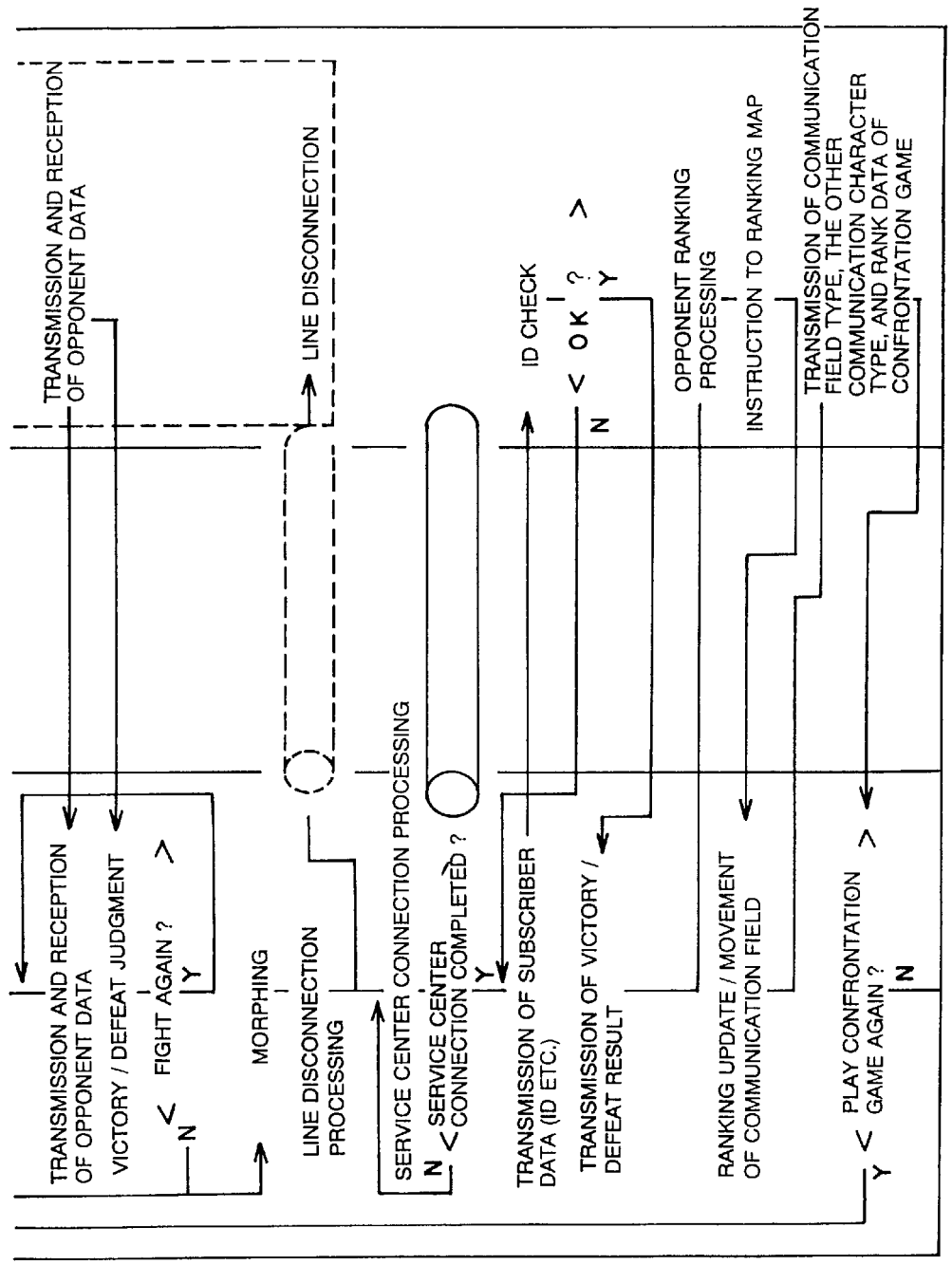
Figure 16:
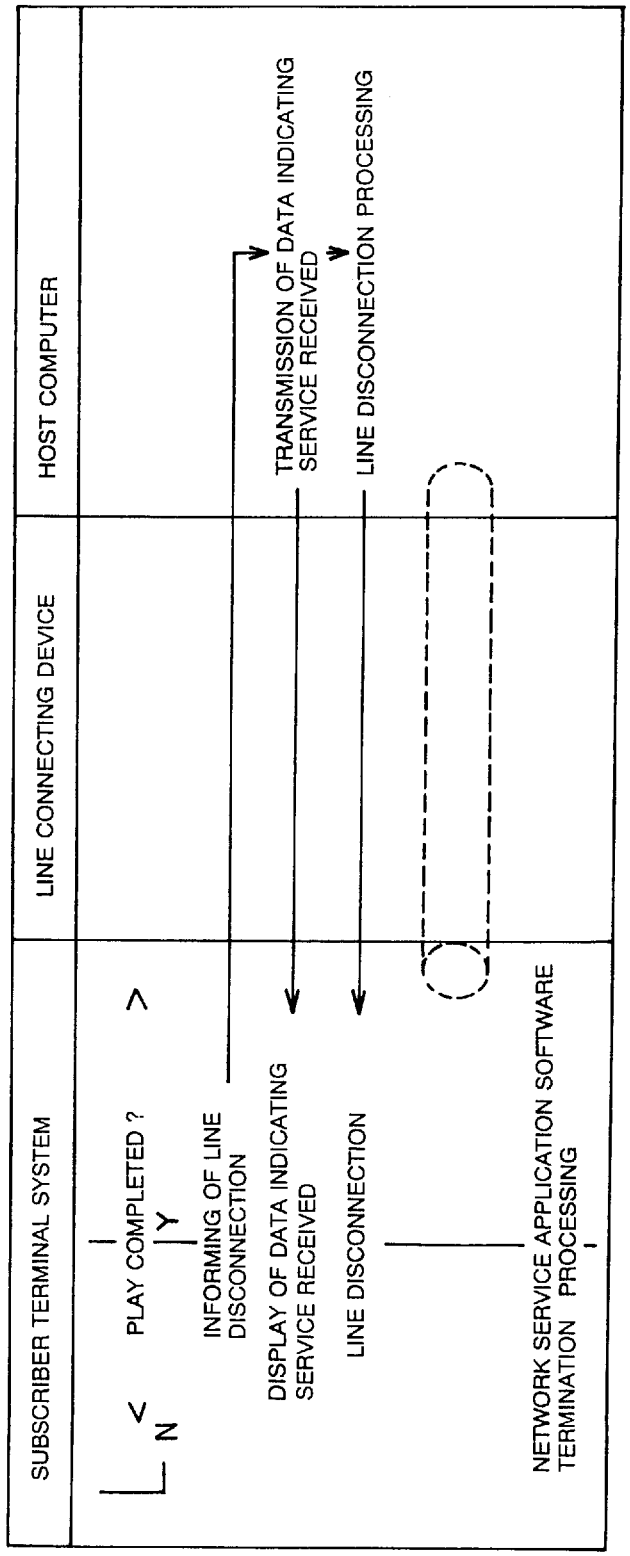

FIGS. 14 to 16 show a sequence of a process in which the subscriber A terminal apparatus 21 receives a communication service by accessing the host computer 135, the connection to the host computer 135 is temporarily cut after determination of an opponent, a game is played by the terminal apparatuses 21 and 22 that are directly connected to each other via the network 13, and the host computer 135 is informed of a result of the game.

Embodiment 3

Figure 12:
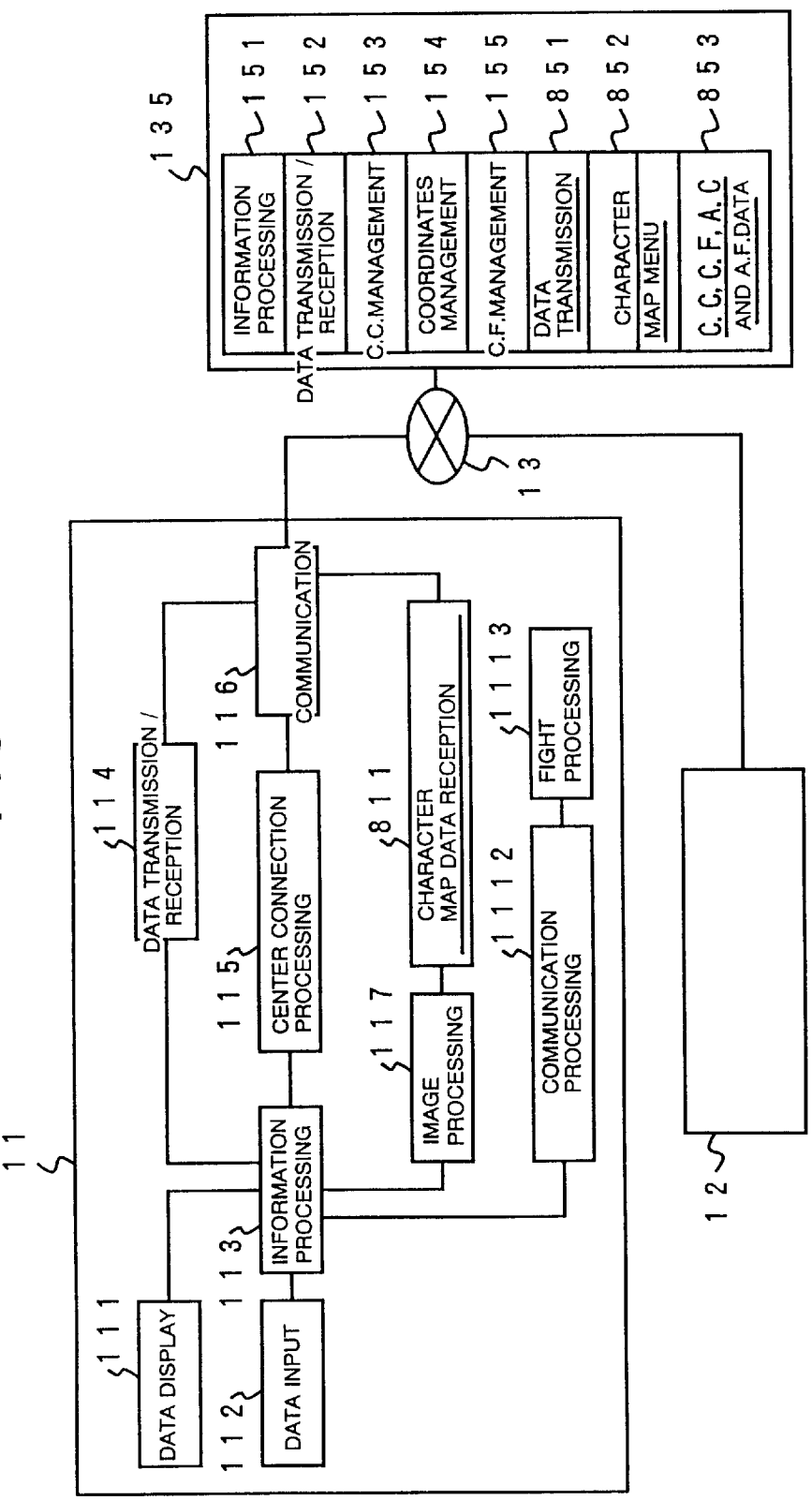
FIG. 12 shows a functional configuration of Embodiment 3 of the invention.

FIG. 12 shows a functional configuration of Embodiment 3. The processing procedure of Embodiment 3 is the same as that of Embodiments 1 and 2 in most parts and different therefrom in the following points.

In this embodiment, all of a communication character, a communication field, an action character, and an action field are supplied from the host computer 135 to a subscriber terminal apparatus 31.

That is, when subscriber A (terminal apparatus 31) receives a network service by establishing connection to the host computer 135, communication character data, communication field data, action character data, action field data, and field data types (853) are transmitted to the terminal apparatus 31 by a data transmission function 851 with activating a character map menu function 852 of the host computer 135.

In the terminal apparatus 31, the data received by a character map data reception function 811 is stored, and an image to be displayed on the display 1313 is generated by using part of the stored data with activating the image processing function 117.

As described above, according to this embodiment, since the character and field data can be managed integrally by the host computer 135, the characters and fields can be changed easily.

While in the above embodiments the intermediate images (see FIG. 27) are prepared for the character morphing, intermediate image changes from the communication character 151a as the starting image to the action character 151d as the final image may be effected by using a morphing algorithm.

While in the above embodiments the action character 151d (see FIG. 28, for instance) is a confrontation game character that simulates a person, the invention is not limited to this case but may use other characters such as a racing car.

In the latter case, the system may be so constructed that communication characters are transformed into racing cars and a car race game is played by subscribers.

According to the invention, a communication character service and an action character service can be dealt with by an integral system. In particular, since an opponent can be searched for from among a number of subscribers, a game becomes more interesting than in a case where an opponent is predetermined.

What is claimed is:

1. A network game system having a communication service mode in which a plurality of communication characters are displayed on display means of terminal apparatuses connected to a network and a conversation is performed between the communication characters, and an action game service mode in which a plurality of action characters are displayed on the display means and a game is played between the action characters, said network game system comprising:

a terminal apparatus comprising:
 display means;
 input means;
 communication character data that can be selectively displayed on the display means to perform a conversation with other subscribers through network communication;
 communication field data commonly used by subscribers who receive a communication service;
 action character data that can be selectively displayed on the display means to perform an action game with another subscriber through network communication;
 action field data commonly used by subscribers who receive an action game service; and
 character transforming means for transforming the communication character to the action character; and a host computer for managing communication character data of a subscriber, position data of the communication character, and the communication field data in accordance with an operation that is input through the terminal apparatus, wherein when the terminal apparatus of a subscriber selects one of the communication characters and one of the action characters, establishes connection to the host computer, and designates a desired communication field, the host computer recognizes that a current mode is the communication service mode and sends, to the terminal apparatus of the subscriber, communication character data of other subscribers existing in the designated communication field and corresponding coordinates data, and the communication character operated by the subscriber and the communication characters operated by the other subscribers are displayed on the display means of each of the terminal apparatuses of the subscriber and the other subscribers in the same communication field, whereby a conversation between the displayed communication characters is enabled based on data that is inputted through the input means, and wherein when the terminal apparatus of the subscriber expresses, through the input means, an intention of playing a game with any of the other subscribers existing in the same communication field, the terminal apparatus of the subscriber recognizes transition to the action game service mode and transforms communication character to the previously selected action character by activating the character transforming means.

2. The network game system according to claim 1, wherein the host computer directly connects the terminal apparatuses of the subscribers upon the transition from the communication service mode to the action game service mode.

3. The network game system according to claim 1, wherein the terminal apparatus of the subscriber or the host computer has the action field data, and wherein upon the transition from the communication service mode to the action game service mode, switching is made from the communication field to an action field.

4. The network game system according to claim 1, wherein when the terminal apparatus of the subscriber selects the communication character that becomes a game opponent, the host computer transmits, to the respective subscribers, names of the respective subscribers on a network which names are preliminarily given to the communication characters of the respective subscribers.

5. The network game system according to claim 1, wherein the terminal apparatus of the subscriber has a function of informing the host computer of its own telephone number, and the host computer has a function of retrieving a place name based on the received telephone number, and wherein the communication character is displayed together with the place name.

6. The network game system according to claim 1, wherein the terminal apparatus of the subscriber or the host computer has a function of storing victory and defeat results of past action game services with ranking, and wherein ranks of the respective subscribers are displayed in the communication field.

7. The network game system according to claim 6, wherein subscribers of higher ranks in data of the victory and defeat results with the ranking can be displayed, and wherein a subscriber who challenges one of the subscribers of higher ranks causes calling to the terminal apparatus of the one higher-rank subscriber.

8. The network game system according to claim 1, wherein the host computer stores at least character data and field data, and transmits the character data and the field data after connection to a terminal apparatus is established through a communication line.

* * * * *